(12) United States Patent
Zhou et al.

(10) Patent No.: US 8,681,590 B2
(45) Date of Patent: Mar. 25, 2014

(54) APPARATUS FOR INCREASING DATA RATES IN A MAGNETIC HEAD

(75) Inventors: Hua Zhou, Plymouth, MN (US); Jie Zou, Eden Prairie, MN (US); Kaizhong Gao, Shoreview, MN (US); Amit Vasant Itagi, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/173,811

(22) Filed: Jun. 30, 2011

(65) Prior Publication Data

US 2012/0170429 A1    Jul. 5, 2012

Related U.S. Application Data

(60) Provisional application No. 61/416,852, filed on Nov. 24, 2010.

(51) Int. Cl.
*G11B 11/00* (2006.01)

(52) U.S. Cl.
USPC ............ 369/13.33; 369/13.13; 360/123.03; 360/125.74; 360/59

(58) Field of Classification Search
USPC ........ 369/13.33, 13.32, 13.02, 13.03, 112.27, 369/13.13, 13.01, 13.12; 360/75, 217, 360/123.45, 123.46, 123.38, 123.17, 360/123.03, 59, 128, 125.74, 234.5, 125.04, 360/125.47, 123.21, 244.3; 29/603.07
See application file for complete search history.

(56) References Cited

U.S. PATENT DOCUMENTS

| | | | |
|---|---|---|---|
| 5,408,373 A * | 4/1995 | Bajorek et al. | 360/244.3 |
| 6,842,307 B2 * | 1/2005 | Sasaki et al. | 360/123.21 |
| 6,950,260 B2 | 9/2005 | Coffey et al. | |
| 7,193,817 B2 * | 3/2007 | Lille | 360/128 |
| 7,233,458 B2 * | 6/2007 | Brusca et al. | 360/123.17 |
| 7,362,542 B2 * | 4/2008 | Baer et al. | 360/123.36 |
| 7,505,226 B2 * | 3/2009 | Hsiao et al. | 360/125.47 |
| 7,536,778 B1 * | 5/2009 | Baer et al. | 29/603.16 |
| 7,595,960 B2 * | 9/2009 | Shimizu et al. | 360/234.5 |
| 7,609,480 B2 * | 10/2009 | Shukh et al. | 360/125.74 |
| 7,609,591 B2 | 10/2009 | Suh et al. | |
| 7,633,711 B2 * | 12/2009 | Hsiao et al. | 360/123.38 |
| 7,703,194 B2 * | 4/2010 | Brusca et al. | 29/603.14 |
| 7,791,839 B2 | 9/2010 | Olson et al. | |
| 7,880,996 B2 * | 2/2011 | Stipe | 360/59 |
| 8,169,881 B2 * | 5/2012 | Balamane et al. | 369/112.27 |
| 8,472,286 B2 * | 6/2013 | Stipe | 369/13.33 |
| 2007/0165495 A1 | 7/2007 | Lee et al. | |
| 2008/0013912 A1 | 1/2008 | Shukh et al. | |
| 2008/0112080 A1 * | 5/2008 | Lengsfield et al. | 360/125.04 |
| 2008/0170319 A1 | 7/2008 | Seigler et al. | |
| 2010/0165499 A1 | 7/2010 | Stipe | |
| 2010/0165802 A1 | 7/2010 | Stipe | |
| 2010/0165822 A1 | 7/2010 | Balamane | |

FOREIGN PATENT DOCUMENTS

| | | |
|---|---|---|
| JP | 58-19717 | 2/1983 |
| JP | 9-106509 | 4/1997 |
| JP | 11-110717 | 4/1999 |
| JP | 2002-25011 | 1/2002 |
| JP | 2005-100520 | 4/2005 |

* cited by examiner

*Primary Examiner* — Ali Neyari
(74) *Attorney, Agent, or Firm* — Braden Katterheinrich

(57) ABSTRACT

In accordance with certain embodiments, a magnetic head has a coil, which has a lead coil turn positioned between a yoke and an air-bearing surface. In certain embodiments, a magnetic head has a coil, which has a lead coil turn minimally spaced from a main write pole.

20 Claims, 4 Drawing Sheets

APPARATUS FOR INCREASING DATA RATES IN A MAGNETIC HEAD

RELATED APPLICATIONS

The present application is related to U.S. provisional patent application Ser. No. 61/416,852 filed on Nov. 24, 2010, entitled "An Apparatus For increasing Data Rates In A Magnetic Head" from which priority is claimed under 35 U.S.C. §119(e) and which application is incorporated by reference herein in its entirety.

SUMMARY

Certain embodiments of the present invention are generally directed to a magnetic head. As areal densities in magnetic storage devices continue to increase, there is a need for magnetic heads that are able to write at increased data rates.

In accordance with certain embodiments, a magnetic head has a coil, which has a lead coil turn positioned between a yoke and an air-bearing surface. In certain embodiments, a magnetic head has a coil, which has a lead coil turn minimally spaced from a main write pole.

These and other features and aspects characterizing various embodiments of the present invention can be understood in view of the following detailed discussion and the accompanying drawings.

DETAILED DESCRIPTION

As will be recognized by those skilled in the art, storage devices can be provisioned with a magnetic head having a reader portion and a writer portion. The writer portion writes to a recordable medium by providing a magnetic field to the recordable medium, which serves as a flux return path from the writer portion to the reader portion. To write data to the recording medium, an electrical current is caused to flow through conductive coils on the magnetic head. The coil current induces a magnetic field across write poles. By reversing the polarity of the current through the coils, the polarity of the data written to the recording medium is also reversed. The reader portion can detect magnetic transitions between adjacent oppositely-directed magnetized regions or dots on the recordable medium. As areal densities increase, the rate at which magnetic heads write will need to increase.

Some of the technologies being utilized to increase areal density include heat assisted magnetic recording (HAMR), bit pattern media (BPM), shingled magnetic recording (SMR), and discrete track recording (DTR). As will be recognized by those skilled in the art, storage devices utilizing HAMR can be provisioned with optical elements—such as a laser diode, near field transducer (NFT), waveguide, and gratings, for example—that are configured together to supply a heat source to elevate a temperature of a recording medium. Some of the optical elements can be configured on a magnetic head such that, during operation, the optical elements supply the light or heat source to heat the recording medium while the magnetic head generates a magnetic field for recording data to the recording medium.

One way to increase the rate at which a magnetic head records data is to decrease the magnetic head's rise time. Here, a magnetic head's rise time is the time it takes a magnetic head's field to reach a predetermined threshold after applying a voltage across the head's coils. Placing coils—which induce a magnetic field across write poles—closer to a main write pole decreases the time it takes for current to travel to the main write pole and reach the predetermined threshold; thereby decreasing the rise time. More specifically, placing a lead coil or set of lead coils near the main write pole allows the magnetic head to increase the rate the magnetic head writes data.

Figure 1:
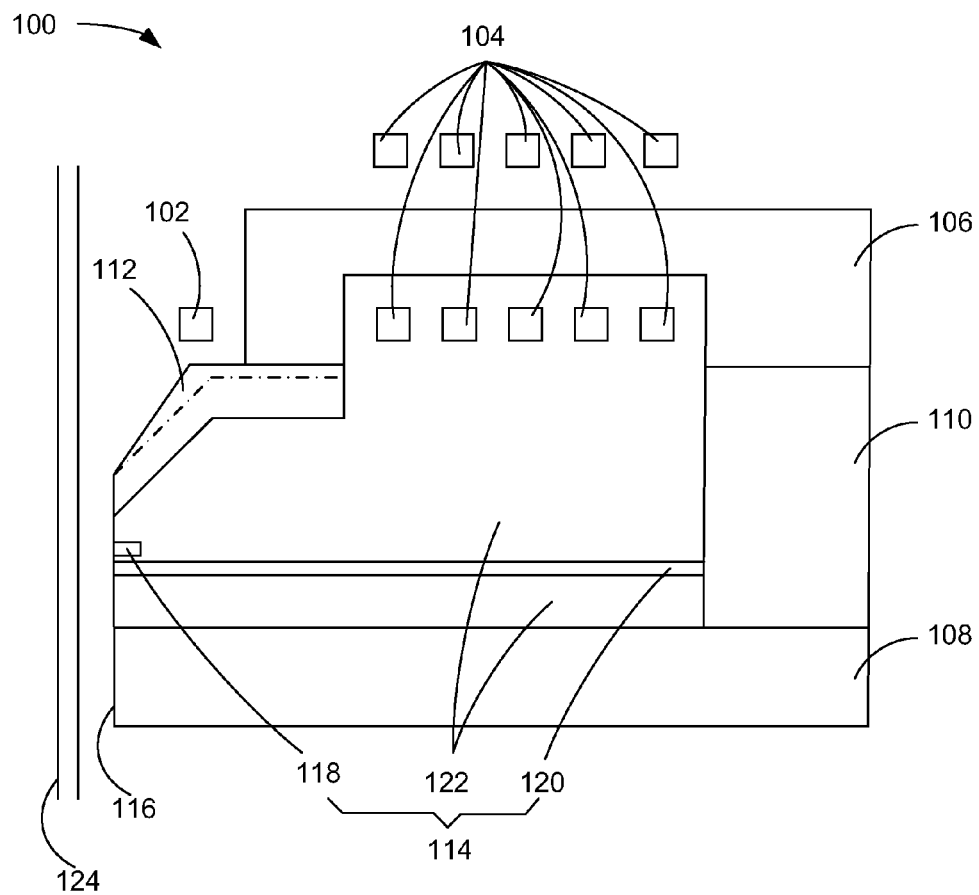
FIG. 1 illustrates a magnetic head in accordance with various embodiments of the present invention.

In accordance with exemplary embodiments, FIG. 1 provides a partial view of a magnetic head 100 having a lead coil 102, coils 104, yoke 106, return pole 108, back via 110, main write pole 112, and optical portion 114. The magnetic head 100 is mounted on a slider (not shown) having an air bearing surface that faces a recording medium 124. An end 116 of the magnetic head 100 may be positioned, for example, at the air-bearing surface or recessed from the air-bearing surface. The lead coil 102 and coils 104 provide a magnetic field that creates a magnetic path through the yoke 106, write pole 108, back via 110, and main write pole 112. The main write pole 112 leaks flux to magnetize the recording medium 124 to perform the recording/writing. The main write pole 112 is shown as but is not limited to a sloped writer design. The phantom lines in FIG. 1 show an alternative main write pole geometry.

The lead coil 102—or alternatively, each of a plurality of lead coils—has a lead coil turn that can be positioned between the air-bearing surface and the yoke 106, which allows the lead coil turn to be positioned adjacent to the main write pole 112. This, in turn, permits the lead coil 102 to provide a magnetic field to the main write pole 112 quickly, resulting in rise times shorter than 1 nanosecond. The lead coil turn can be minimally spaced from the main write pole 112 without risking undesirable effects, such as creating an electric short between the main write pole 112 and the lead coil 102. Although not shown in FIG. 1, the main write pole 112 can be surrounded by heat sink materials. Magnetic materials used in the magnetic head 100 can include those materials recognized in the art, including but not limited to any alloy that has a significant amount of Co, Ni, or Fe. As shown in FIG. 1, the lead coil 102 is positioned between the air-bearing surface and a side of the yoke 106 that is closest to the air-bearing surface, such that no portion of the yoke 106 is closer to the air-bearing surface than the lead coil 102. Simply put, the lead coil turn is closer to the air-bearing surface than any portion of the yoke 106.

Moreover, the lead coil turn can be minimally spaced from the air-bearing surface. At or close to the air-bearing surface, the lead coil 102 may be further exposed to and affected by the recording medium 124 and particles during operation, which negatively affects the lead coil's performance. For example, some lead coil materials' performance may decrease because of corrosion caused by interactions with the recording medium 124. Therefore, the lead coil 102 may be protected from corrosion by embedding, encapsulating, providing a thin film coating, or by other methods recognized in the art; thereby permitting the lead coil 102 to be positioned close to the air-bearing surface and/or close to the main write pole 112 with reduced or negligible negative effects from the recording medium 124, which, in turn, permits the lead coil 102 and main write pole 112 to be configured to provide increased data rates.

As shown in FIG. 1, the coils 104 are configured in a helical coil design. That is, the coils 104 helically wrap around the yoke 106. The number of coil turns in this and other embodiments is illustrative only and can depend on the specifics of the head design. For example, a higher number of coil turns results in a larger generated magnetic field but also greater inductance and resistance. Shorter yoke lengths permit fewer coil turns but also decrease the rise time. As will be shown in the following embodiments, the coils can be configured in a number of designs, as shown but not limited to helical, single pancake, and double pancake designs. Some coil designs may be more complex and more difficult to manufacture based on the design and configuration of the rest of the head (e.g., the geometry of the yoke, main write pole, return pole, optical elements).

As shown in FIG. 1, the optical portion 114 includes a near field transducer (NFT) 118, waveguide core 120, and waveguide cladding 122 surrounding the core 120. FIG. 1 shows the NFT 118 spaced from the main write pole 112, but the NFT 118 can also be positioned to contact the main write pole 112. The waveguide can include those materials recognized in the art, including but not limited to $TiO_2$, $Ta_2O_5$, Si, SiN, ZnS, $SiO_2$, and $Al_2O_3$ for example.

Figure 2:
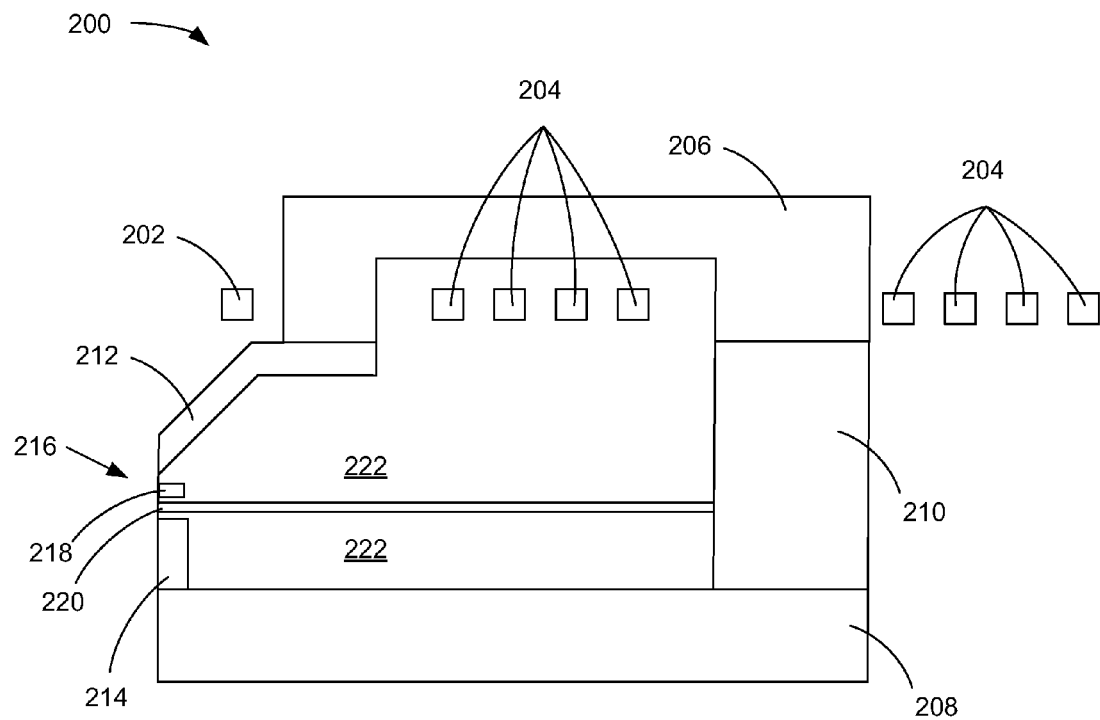
FIG. 2 illustrates a magnetic head in accordance with various embodiments of the present invention.

In accordance with exemplary embodiments, FIG. 2 provides a partial view of a magnetic head 200 having a lead coil 202, coils 204, yoke 206, return pole 208, back pedestal 210, main write pole 212, front shield 214, and optical portion 216. The optical portion 216 includes a NFT 218, waveguide core 220, and cladding 222. The lead coil 202 has a lead coil turn that can be positioned at or between the air-bearing surface and the yoke 206. The lead coil turn can be positioned adjacent to the main write pole 212, thereby quickly providing a magnetic field to the main write pole 212. As shown in FIG. 2, the coils 204 are configured in a single layer planar spiral (single pancake) coil design, which positions a set of coil turns on the side and at the back of the magnetic head 200.

The front shield 214 is positioned at the end of the magnetic head 200 and creates a lower reluctance path and increases the field at the main write pole 212. The position of the front shield 214 in relation to the optical portion 216 is affected by the thickness of the front shield 214. For example, the thicker the front shield 214 is, the more optical energy the front shield 214 absorbs, thereby decreasing the optical efficiency of the heat assisted magnetic head. However, the front shield 214 is more effective (e.g., the front shield's ability to increase the field at the main write pole 212) as it is positioned closer to the main write pole 212. Therefore, determining the position and thickness of the front shield 214 is a balance between reducing the optical efficiency and increasing the magnetic effectiveness.

Figure 3:
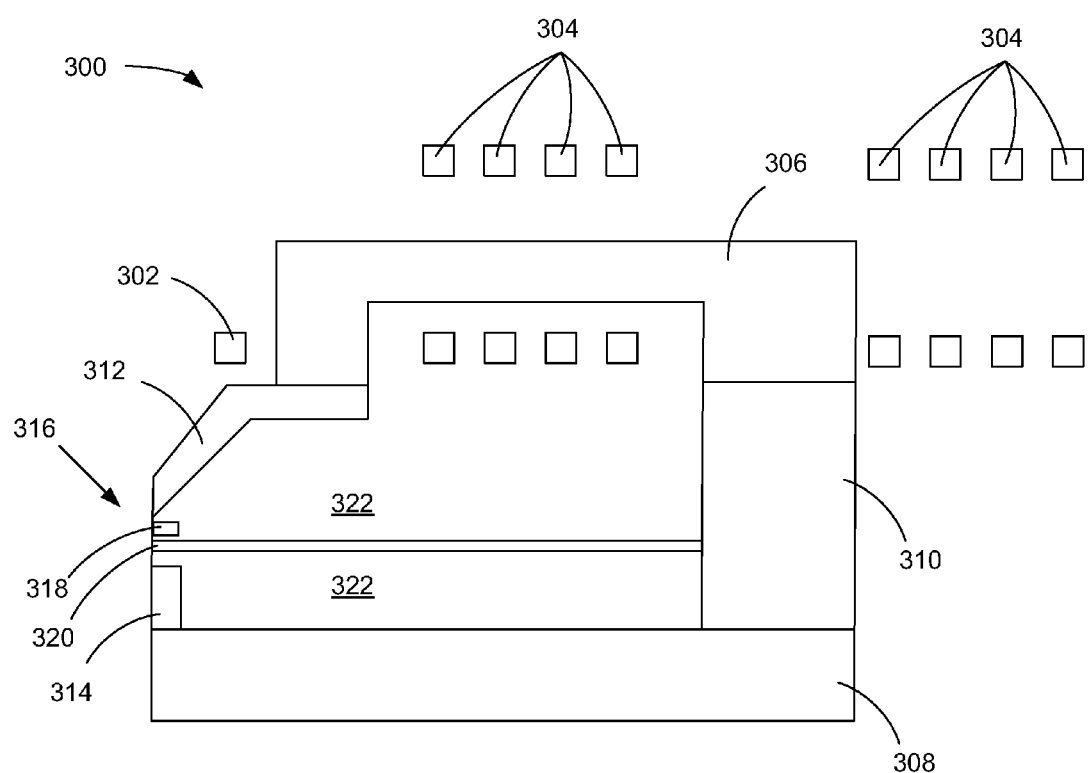
FIG. 3 illustrates a magnetic head in accordance with various embodiments of the present invention.

In accordance with exemplary embodiments, FIG. 3 provides a partial view of a magnetic head 300 having a lead coil 302, coils 304, yoke 306, return pole 308, back pedestal 310, main write pole 312, front shield 314, and optical portion 316. The optical portion 316 includes a NTT 318, core 320, and cladding 322. The lead coil 302 has a lead coil turn that can be positioned at or between the air-bearing surface and the yoke 306. The lead coil turn can be positioned adjacent to the main write pole 312, thereby providing a magnetic field to the main write pole 312 quickly. As shown in FIG. 3, the coils 304 are configured in a double layer planar spiral (double pancake) coil design, which positions two sets of coil turns on the side and at the back of the magnetic head 300. The front shield 314 is positioned at the end of the magnetic head 300 and creates a lower reluctance path and increases the field at the main write pole 310.

Figure 4:
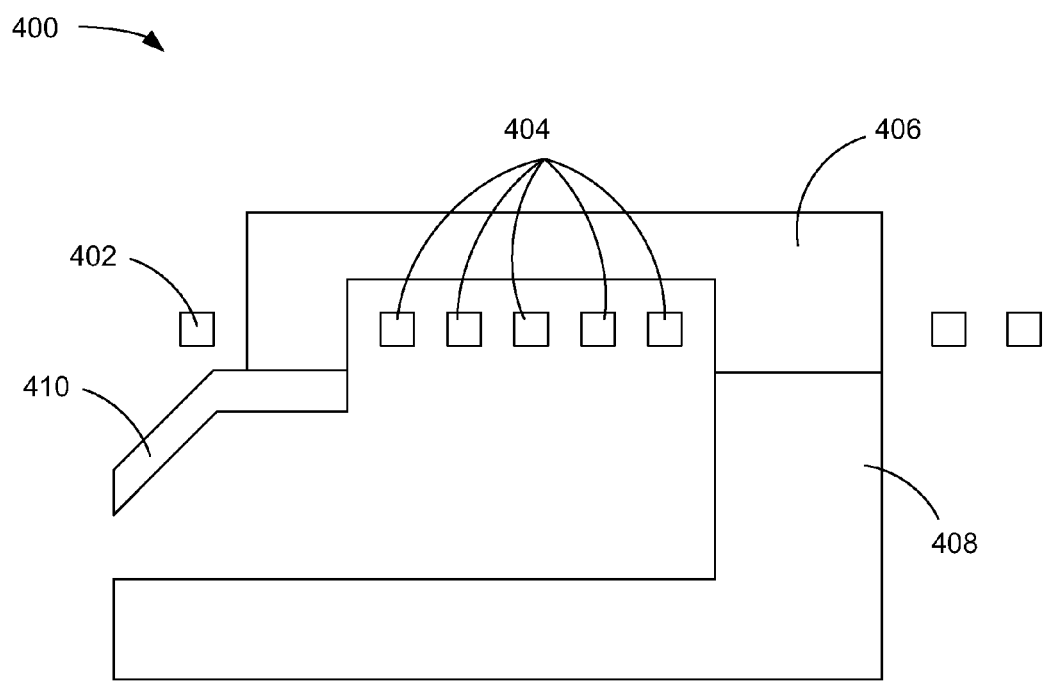
FIG. 4 illustrates a magnetic head in accordance with various embodiments of the present invention.

In accordance with exemplary embodiments, FIG. 4 provides a partial view of a magnetic head 400 having a lead coil 402, coils 404, yoke 406, return pole 408, back pedestal 410, and main write pole 412. The lead coil 402 has a lead coil turn that can be positioned at or between the air-bearing surface and the yoke 406. The lead coil turn can be positioned adjacent to the main write pole 412, thereby providing a magnetic field to the main write pole 412 quickly. As shown in FIG. 4, the coils 404 are configured in a single layer planar spiral (single pancake) coil design. The magnetic head 400 can optionally include a front shield (not shown).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure, arrangements, and number of parts within the principles of the present invention to the full extent indicated by the broad general meaning of the terms in which the appended claims are expressed. For example, coils may be positioned on either side of optical elements and the coils may be configured in a variety of coil designs known in the art. Moreover, the number of lead coils can be greater than one.

What is claimed is:

1. A magnetic head comprising:
   a coil having a lead coil turn positioned at an air-bearing surface.

2. The magnetic head of claim 1, wherein the lead coil turn is positioned adjacent to a main write pole.

3. The magnetic head of claim 2, wherein the lead coil turn is encapsulated.

4. The magnetic head of claim 2, further comprising:
   a plurality of coils helically wrapped around a yoke magnetically coupled to the main write pole.

5. The magnetic head of claim 2, further comprising:
   a plurality of coils wrapped around a yoke in a single pancake design, the yoke being magnetically coupled to the main write pole.

6. The magnetic head of claim 2, further comprising:
   a plurality of coils wrapped around a yoke in a double pancake design, the yoke being magnetically coupled to the main write pole.

7. The magnetic head of claim 1, further comprising:
   a near field transducer; and
   waveguide core surrounded by a waveguide cladding.

8. The magnetic head of claim 7, wherein the near field transducer contacts the main write pole.

9. The magnetic head of claim 1, wherein the lead coil turn is minimally spaced from a main write pole.

10. The magnetic head of claim 9, wherein the main write pole is sloped.

11. A magnetic head comprising:
    a coil having a lead coil turn positioned closer to an air-bearing surface than any portion of a yoke.

12. The magnetic head of claim 11, wherein the lead coil turn is positioned adjacent a main write pole.

13. The magnetic head of claim 12, further comprising:
    a near field transducer; and
    waveguide core surrounded by a waveguide cladding.

14. The magnetic head of claim 13, wherein the lead coil turn is positioned at an air bearing surface.

15. The magnetic head of claim 13, wherein the near field transducer contacts the main write pole.

16. The magnetic head of claim 13, further comprising:
a plurality of coils helically wrapped around the yoke.

17. The magnetic head of claim 13, further comprising:
a plurality of coils wrapped around a yoke in a single pancake design.

18. The magnetic head of claim 13, wherein the lead coil turn is encapsulated.

19. A magnetic head having an air-bearing surface, the magnetic head comprising:
a yoke, back pedestal return pole, and write pole coupled together; and
a coil having a lead coil turn positioned closer to the air-bearing surface than any portion of the yoke.

20. The magnetic head of claim 19, wherein the lead coil turn is positioned adjacent to a main write pole.

* * * * *